April 23, 1957 W. SHANNON 2,789,865
MOBILE WATERING DEVICE
Filed Feb. 3, 1955

INVENTOR.
William Shannon
BY Orville R. Seidner
AGENT

United States Patent Office 2,789,865
Patented Apr. 23, 1957

2,789,865

MOBILE WATERING DEVICE

William Shannon, Alhambra, Calif., assignor to Shaver Manufacturing Company, Los Angeles, Calif., a partnership Application February 3, 1955, Serial No. 485,951

5 Claims. (Cl. 299—57)

The present invention relates to watering devices in general, and particularly relates to such devices of the type used around the home for providing a fine spray to water the plants of a home garden, or alternatively as a hand held device to facilitate the washing of leaves and other small debris off lawns or driveways. The device of the present invention is adapted to be connected to the end of a water hose.

The homeowner has available to him devices which may be attached to the end of the hose for providing a spray or jet to water the plants or lawn. Some of the devices are of the fixed variety, and others may be of the type exemplified by an adjustable nozzle. Some are provided with a base to be laid on the ground while others have a spike which may be pushed into the ground so as to hold the nozzle in desired position. So far as is known, none of them provide means for regulating the flow of the water and other means for regulating the discharge pattern at the nozzle. Thus, it is necessary usually that the user must of necessity regulate the flow by adjusting the hose bib to which the inlet end of the hose is connected. Such remote adjustment is unsatisfactory, particularly so if the nozzle end has been placed at the desired spot to be watered and cannot be seen from the bib. After the hose bib is regulated to what is believed to be the proper flow, the user must then return to the nozzle to adjust it for proper pattern, if the nozzle is of the adjustable variety. It is likewise unsatisfactory to hold the nozzle end in one hand and adjust the bib with the other, since the nozzle end must then be carried to the spot desired to be watered. The user usually ends up in the latter case by getting water on himself, either in carrying the nozzle or in its placement and positioning at the desired location.

It is an object of this invention, therefore, to provide a nozzle having means to regulate the flow of water and having means to adjust the water discharge pattern. It is a further object to provide such a novel nozzle as a simple and compact device which may be attached to the end of a hose or conduit having means to attach a hose thereto.

It is another object of the invention to provide a nozzle carrier which having means for the convenient placement of the nozzle with respect to the flora to be watered, with a folding stand structure to adjust the angle of the nozzle with respect to the ground or other supporting surface on which it rests. It is further within the purview of the invention that the nozzle carrier comprises a handle adapted to be carried in the crook of the arm, for example, whereby debris on the lawn or driveway may be readily hosed off without having to bend over to hold the nozzle close to the ground.

Further objects and advantages of the invention will be apparent to those skilled in the art upon examination of the drawing and study of the specification wherein a preferred embodiment is disclosed as exemplary of the invention.

Referring to the drawing.

Figure 1:
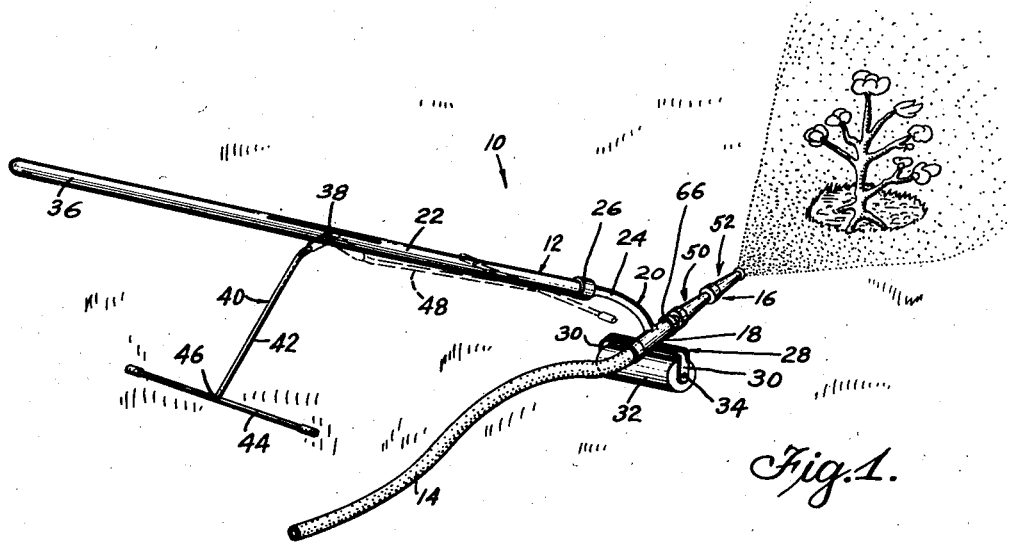
Fig. 1 is a perspective view of the invention showing one of its uses.

Referring to Fig. 1 there is shown a watering device 10 comprising a collapsible stand means 12 arranged to have a water hose 14 and nozzle means 16 attached thereto by way of the conduit 18 secured adjacent the foot portion 20 of the elongate stand member 22. The conduit 18 may be secured at a point more distal of the foot, if desired, of course. The foot portion 20 preferably includes a neck 24 having an open socket 26 at its upper end and an inverted cradle 28 at its lower end, the cradle being formed with two descending legs 30 adapted to have a roller 32 journaled therebetween in any preferred manner, as by a pin shaft 34, for example. The roller is desirable for the purpose of ease of transport of the watering device from place to place.

The socket 26 is arranged to have secured therewithin an elongate handle 36 which serves a dual purpose, one of which is a means for carrying the device 10 or wheeling it about on the roller 32. The handle 36 also serves as a part of the stand means 12, to which end it has hingedly connected thereto at a mid point 38, somewhat distal of the foot portion 20, one end of a second stand member 40. The latter is preferably of an inverted T-shape and comprises a leg 42 to the lower end of which a foot member 44 is secured at its mid point 46.

By reason of the hinged connection between the two stand members, the angle which the nozzle 16 makes with the ground or other supporting surface may be varied at will so as to adjust the arc of the stream or spray of water. Furthermore, the foot 44 of the stand member 40 and the roller 32 on the stand member 22 provide an effective three-point support for the device 10 to give it lateral stability in a substantially upright position.

It will be appreciated at once by those skilled in the art that the cradle 28 and foot 44 could be interchanged on the stand members 22 and 40 without departing from the spirit of the invention. In that event the roller 32 would form a single point of support on the lower end of the leg 42 and the foot member 44 would provide the remaining two points of support on the lower end of the neck 24.

Figure 2:
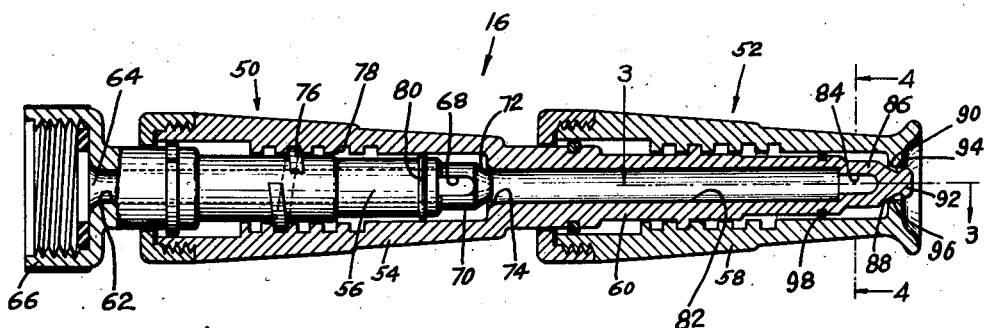
Fig. 2 is a cross-section view of the nozzle means employed on the device shown in Fig. 1.
Figure 4:
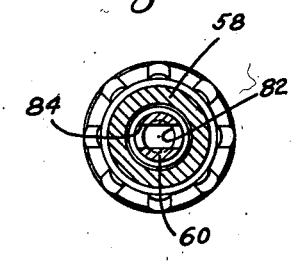
Fig. 4 is a cross-section view taken on the line 4—4 of Fig. 2.
Figure 3:
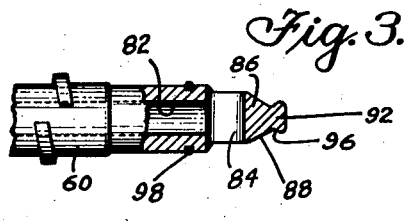
Fig. 3 is a fragmentary partly sectioned view of a portion of the nozzle core, taken on line 3—3 of Fig. 2.

The nozzle 16 forms a distinctive and novel contribution to the invention of the device 10. In its broadest aspects the structure of the nozzle (see Figs. 2, 3, and 4) is comprised preferably of fluid flow controls in series, there being a flow regulator means upstream and a pattern control means downstream at the fluid outlet. Thus the gardener is provided with nozzle means affording him extremely fine control over the flow rate and the water pattern and he can adjust it from a very fine mist for delicate flora at very low rate of flow (giving the sensitive flowers and plants the equivalent of a fine mist-like rain), or a jet stream of water at maximum rate for washing leaves or debris off lawns or driveways.

For the latter purpose the upper portion of the handle 36 may be conveniently disposed in the hollow between the upper arm and shoulder whereby the jet stream is readily directed from a standing position. To this end, the stand member 40 may be swung on its hinge connection so as to be adjacent the lower portion of the handle 36, as shown at 48 by dotted lines in Fig. 1.

Referring again to Figs. 2, 3, and 4, the nozzle means 16 comprises in substance the equivalent of two commercially available nozzles modified and joined end to end, as shown generally at 50 and 52. Thus, the nozzle 50 includes a ribbed sleeve 54 threadably engaged with a core member 56, and the nozzle 52 includes a ribbed sleeve 58 threadably engaged with a core member 60, the latter core member being integral with and forming an extension of the sleeve 54.

The core member 56 defines a central bore 62 which communicates with the open end 64 of the core, the end 64 comprising a threaded annulus 66 adapted to be secured onto the end of a hose or of the conduit 18 of Fig. 1. The opposite end of the bore 62 communicates with a cross-wise passageway 68 formed adjacent the end 70 of the core 56. The said opposite end of the core is provided with a valve face 72 arranged to cooperate with a seat 74 in the sleeve 54 to provide a fluid flow regulator.

The core 56 is further provided with a threaded portion 76 adapted to be engaged by the internally threaded part 78 of the sleeve 54 whereby the fluid flow past the valve face 72 and seat 74 may be regulated at will by turning the sleeve 54 by hand with respect to the core 56. An O-ring seal 80 is provided to prevent leakage of the fluid from the passageway 68 back through the clearance space between the core and sleeve.

As aforesaid, the forward end of the sleeve member 54 comprises the core member 60, which is provided with a bore 82 communicating with the bore 62 in the core 56 by way of the passageway 68 and valve members 72 and 74. The forward end of the bore 82 communicates with a crosswise passageway 84 formed adjacent the end 86 of the core 60. The end 86 of the core is likewise provided with a valve face 88 cooperable with a seat 90 in the sleeve 58. The tip 92 on the extreme end of the core 60 is formed in the usual manner so as to cooperate with the passageway 94 in the forward end of the sleeve 58 and the contoured front face 96 thereof to provide a flow pattern control in the manner well known in the art. To this end, the core 60 and sleeve 58 are provided with threaded portions and parts in the manner described above with respect to nozzle 50. Likewise, an O-ring seal member 98 is positioned between the core 60 and sleeve 58.

It is now apparent that the invention has provided a very useful and compact device, together with novel organization and cooperative relationship of parts readily adaptable to the purposes outlined in the objects.

I claim:

1. A gardener's watering device, comprising: collapsible stand means adapted to be placed on a supporting surface, including first and second elongate stand members, said first member being of inverted T-shape with the horizontal foot portion thereof adapted to contact said supporting surface at spaced apart points, the distal end of the other portion thereof being hingedly connected to said second member at a point distal of a foot portion thereof, said foot portion also being adapted to contact said supporting surface, said foot portions thereby being adapted to support said stand means in a substantially upright position with lateral stability with one of said stand members at a variable angle to said supporting surface; a nozzle adjacent the foot portion of said one of said members, said nozzle defining a passageway open at its axially opposite ends and provided with means intermediate said ends for regulating water flow therethrough, said nozzle including means adjacent the outlet end thereof defining a pattern forming means for fluid leaving said passageway, said pattern forming means being provided with means for adjusting the same for varying the pattern of flow of water from said nozzle; and means at the other end of said nozzle passageway for connecting a water hose to said nozzle.

2. A gardener's watering nozzle comprising; first, second and third tubular members of generally frustoconical shape; screw thread means adjustably connecting said first and second members for movement axially of one another; valve means between the discharge end of said first member and the interior mid-portion of said second member for controling the flow of water from the interior of said first member to the discharge end of said second member; the discharge end of said second member being closed and being axially adjustable through a restricted axial port in the discharge end of said third member to vary the pattern of the water discharging therepast; and means for connecting a pressurized water source to the inlet end of said first tubular member.

3. A gardener's watering nozzle as defined in claim 2 including a pair of resilient sealing ring means axially spaced between said first and second members as well as between said second and third members, said sealing ring means serving to hold said members concentrically centered relative to one another while permitting said tubular members to shift axially in opposite directions and preventing water flow therepast.

4. A gardener's watering nozzle assembly comprising a relatively long tubular member having an open inlet end, the opposite axial end of said tubular member being closed and having at least one outwardly directed water outlet adjacent said closed end, a relatively short tubular member rotatably supported by said first tubular member adjacent the open inlet end thereof, said relatively long and short tubular members cooperating upon rotation relative to one another to control the flow of water toward the axially-closed end of said first tubular member, a third tubular member encircling the discharge end of said long tubular member, and means for adjusting the spray pattern of the water discharging through an annular opening located between the axially adjustable discharge ends of said long tubular member and said third member, said means including helical thread means between said first and third members for effecting the movement of one member axially of the other member.

5. A gardener's watering nozzle comprising a compact unitary assembly adapted to be attached to the discharge end of a pressurized water supply line, said nozzle including first, second and third tubular members each having a passage therethrough, said first member being relatively long, said second and third members being relatively short and rotatably coupled to the opposite end portions of said long tubular member, said second member being located adjacent the water inlet end of said long member and being rotatable relative thereto to control the flow of water to the water outlet end of said long member, said third member being mounted concentrically about the outlet end of said long member and cooperating therewith to provide an annular water outlet, said third member having a helical thread connection with said first tubular member for effecting the axial adjustment of said first and third members as the same are rotated relative to one another, and mutually cooperating means between the juxtaposed outlet ends of said first and third members for adjusting the water spray pattern issuing therefrom as said members are axially adjusted.

References Cited in the file of this patent
UNITED STATES PATENTS

| 1,724,702 | Flickinger | Aug. 13, 1929 |
| 2,252,698 | Button | Aug. 19, 1941 |
| 2,629,633 | Wright | Feb. 24, 1953 |
| 2,638,730 | Davidson | May 19, 1953 |